United States Patent
Kim et al.

(10) Patent No.: US 11,591,667 B2
(45) Date of Patent: Feb. 28, 2023

(54) HIGH-STRENGTH STEEL SHEET HAVING EXCELLENT IMPACT RESISTANT PROPERTY AND METHOD FOR MANUFACTURING THEREOF

(71) Applicant: POSCO, Pohang-si (KR)

(72) Inventors: Sung-Ii Kim, Gwangyang-si (KR); Hyun-Taek Na, Gwangyang-si (KR); Dong-Wan Kim, Gwangyang-si (KR)

(73) Assignee: POSCO CO., LTD, Pohang-si (KR)

( * ) Notice: Subject to any disclaimer, the term of this patent is extended or adjusted under 35 U.S.C. 154(b) by 33 days.

(21) Appl. No.: 17/261,232

(22) PCT Filed: Jul. 24, 2019

(86) PCT No.: PCT/KR2019/009184
§ 371 (c)(1),
(2) Date: Jan. 19, 2021

(87) PCT Pub. No.: WO2020/022778
PCT Pub. Date: Jan. 30, 2020

(65) Prior Publication Data
US 2021/0269892 A1 Sep. 2, 2021

(30) Foreign Application Priority Data
Jul. 25, 2018 (KR) .................. 10-2018-0086569

(51) Int. Cl.
| | | |
|---|---|---|
| C21D 9/46 | (2006.01) | |
| C21D 8/02 | (2006.01) | |
| C21D 6/00 | (2006.01) | |
| C22C 38/58 | (2006.01) | |
| C22C 38/50 | (2006.01) | |
| C22C 38/48 | (2006.01) | |
| C22C 38/06 | (2006.01) | |
| C22C 38/02 | (2006.01) | |
| C22C 38/00 | (2006.01) | |

(52) U.S. Cl.
CPC .............. *C21D 9/46* (2013.01); *C21D 6/002* (2013.01); *C21D 6/005* (2013.01); *C21D 6/008* (2013.01); *C21D 8/0205* (2013.01); *C21D 8/0226* (2013.01); *C22C 38/001* (2013.01); *C22C 38/002* (2013.01); *C22C 38/02* (2013.01); *C22C 38/06* (2013.01); *C22C 38/48* (2013.01); *C22C 38/50* (2013.01); *C22C 38/58* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | |
|---|---|---|
| 9,540,719 B2 | 1/2017 | Perlade et al. |
| 2009/0136378 A1 | 5/2009 | Satou et al. |
| 2010/0047617 A1 | 2/2010 | Sugiura et al. |
| 2014/0007993 A1 | 1/2014 | Nakajima et al. |
| 2014/0377584 A1 | 12/2014 | Hasegawa et al. |
| 2017/0009316 A1 | 1/2017 | Yamazake et al. |
| 2018/0044749 A1 | 2/2018 | Shuto et al. |
| 2020/0071786 A1 | 3/2020 | Seo et al. |
| 2020/0080167 A1 | 3/2020 | Kim et al. |
| 2021/0140005 A1 | 5/2021 | Yoshida et al. |

FOREIGN PATENT DOCUMENTS

| | | |
|---|---|---|
| CN | 103857820 | 6/2014 |
| EP | 1028167 | 8/2000 |
| EP | 2740812 | 6/2014 |
| JP | H06293910 | 10/1994 |
| JP | 2000239791 | 9/2000 |
| JP | 2000297350 | 10/2000 |
| JP | 2001226744 | 8/2001 |
| JP | 2001316762 | 11/2001 |
| JP | 2008274395 | 11/2008 |
| JP | 2014043630 | 3/2014 |
| JP | 5967311 | 8/2016 |
| KR | 101114672 | 3/2012 |
| KR | 101528084 | 6/2015 |
| KR | 20150074943 | 7/2015 |
| KR | 20150075312 | 7/2015 |
| WO | 2016133222 | 8/2016 |
| WO | 2018110853 | 6/2018 |
| WO | 2018117470 | 6/2018 |
| WO | 2019009410 | 1/2019 |

OTHER PUBLICATIONS

Japanese Office Action—Japanese Application No. 2021-502556 dated Mar. 1, 2022, citing JP 2008-274395, JP 2014-043630, WO 2016/133222, JP 2000-297350, JP 2000-239791, and WO 2019/009410.
International Search Report—PCT/KR2019/009184 dated Oct. 30, 2019.
European Search Report—European Application No. 19841097.9 dated Jul. 28, 2021, citing U.S. Pat. No. 9,540,719, WO 2018/110853, and WO 2018/117470.

*Primary Examiner* — Anthony M Liang
(74) *Attorney, Agent, or Firm* — Cantor Colburn LLP

(57) ABSTRACT

Provided is a high-strength steel sheet having high impact resistance. The steel sheet includes: by weight %, carbon (C): 0.05% to 0.14%, silicon (Si): 0.01% to 1.0%, manganese (Mn): 1.5% to 2.5%, aluminum (Al): 0.01% to 0.1%, chromium (Cr): 0.005% to 1.0%, phosphorus (P): 0.001% to 0.05%, sulfur (S): 0.001% to 0.01%, nitrogen (N): 0.001% to 0.01%, niobium (Nb): 0.005% to 0.06%, titanium (Ti): 0.005% to 0.11%, and the balance of iron (Fe) and inevitable impurities. The steel sheet has a microstructure comprising ferrite and bainite in a total area fraction of 90% or more. The steel sheet has a value of 0.05 to 1.0 as a shear texture ({110}<112>, {112}<111>) area ratio of a center region (ranging deeper than $1/10t$ to $1/2t$ in a thickness direction, t refers to thickness (mm)) and a surface region (ranging from a surface to $1/10t$ in the thickness direction).

3 Claims, 1 Drawing Sheet

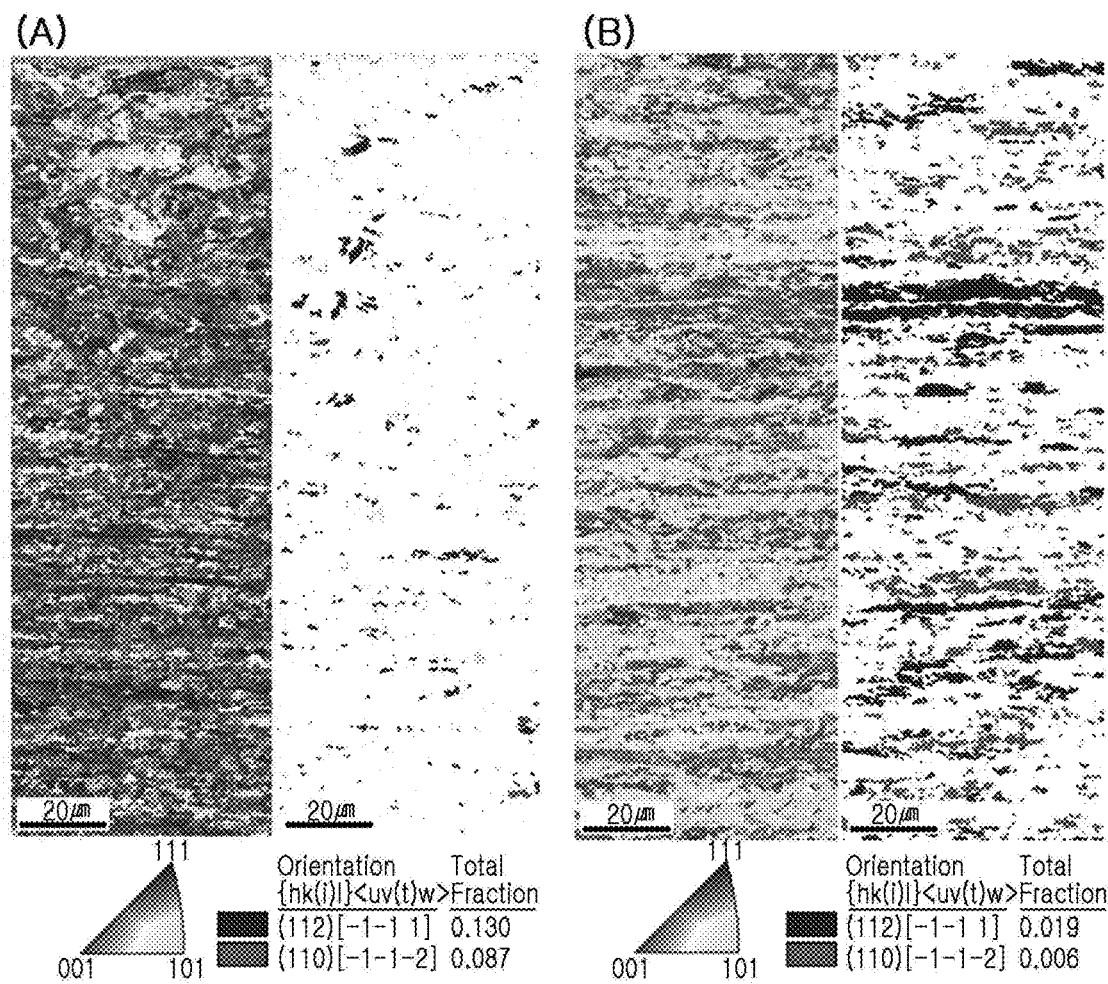

HIGH-STRENGTH STEEL SHEET HAVING EXCELLENT IMPACT RESISTANT PROPERTY AND METHOD FOR MANUFACTURING THEREOF

TECHNICAL FIELD

The present disclosure relates to a steel sheet for automobile chassis parts, and more particularly, to a high-strength steel sheet having high impact resistance property and a method for manufacturing the high-strength steel sheet.

BACKGROUND ART

High-strength hot-rolled steel sheets are mainly used for automotive parts such as chassis members, lower arms, reinforcing materials, or connecting materials, and techniques for improving the formability of such high-strength hot-rolled steel sheets have been proposed.

For example, techniques for improving the stretch-flangeability of steel sheets by forming the steel sheets as complex-phase steel sheets having a ferrite-bainite dual phase as a microstructure, or techniques for manufacturing steel sheets having high-strength and high-burring properties by forming ferrite or bainite as a matrix have been proposed.

Specifically, in Patent Document 1, a steel sheet is maintained in a ferrite transformation zone for several seconds under specific cooling conditions immediately after hot rolling, and then the steel sheet is coiled at a bainite formation temperature such that bainite is formed in the steel sheet, thereby forming a complex phase of polygonal ferrite and bainite as the microstructure of the steel sheet and guaranteeing the strength and stretch-flangeability of the steel sheet.

In addition, Patent Document 2 discloses a high-burring steel having C—Si—Mn-based bainitic ferrite and granular bainitic ferrite as a matrix, and Patent Document discloses a method for improving the stretch-flangeability of a steel sheet by forming bainite in an area fraction of 95% or more and minimizing grains stretched in the rolling direction.

To manufacture the above-mentioned high-strength steels, alloying elements such as Si, Mn, Al, Mo, and Cr are mainly used, which are effective in improving the strength and stretch-flangeability of hot-rolled steel sheets.

However, it is necessary to add such alloying elements in large amounts to improve the above-mentioned physical properties, causing segregation of the alloying elements, non-uniform microstructures, or the like and thus results in deterioration in stretch-flangeability. In addition, automobiles using steels containing large amounts of such alloying elements have poor crashworthiness because when automobiles crash, fractures easily occur in regions in which the alloying elements are segregated and regions having non-uniform microstructures.

In particular, the microstructures of high-hardenability steels sensitively change during cooling, causing the formation of uneven low-temperature transformation phases which results in deterioration in impact resistance.

In addition, if precipitate-forming elements such as Ti, Nb, and V are excessively added to increase the strength of steel, although the impact resistance of the steel increases owing to the increase in strength, the formability of the steel deteriorates because recrystallization is greatly delayed during hot rolling and thus microstructures are stretched in the rolling direction.

(Patent Document 1) Japanese Patent Laid-Open Publication No. 1994-293910
(Patent Document 2) Korean Patent Publication No. 10-1114672
(Patent Document 3) Korean Patent Publication No. 10-1528084

DISCLOSURE

Technical Problem

Aspects of the present disclosure are to provide a steel sheet having high strength and high excellent impact resistance and a method for manufacturing the steel sheet.

The scope of the present disclosure is not limited to the above-mentioned aspects. Other aspects of the present disclosure are stated in the following description, and the aspects of the present disclosure will be clearly understood by those of ordinary skill in the art through the following description.

Technical Solution

According to an aspect of the present disclosure, there is provided a high-strength steel sheet having high impact resistance, the high-strength steel sheet including, by weight %, carbon (C): 0.05% to 0.14%, silicon (Si): 0.01% to 1.0%, manganese (Mn): 1.5% to 2.5%, aluminum (Al): 0.01% to 0.1%, chromium (Cr): 0.005% to 1.0%, phosphorus (P): 0.001% to 0.05%, sulfur (S): 0.001% to 0.01%, nitrogen (N): 0.001% to 0.01%, niobium (Nb): 0.005% to 0.06%, titanium (Ti): 0.005% to 0.11%, and the balance of iron (Fe) and inevitable impurities, wherein the high-strength steel sheet has a microstructure including ferrite and bainite in a total area fraction of 90% or more, and the high-strength steel sheet has a value of 0.05 to 1.0 as a shear texture ($\{110\}<112>$, $\{112\}<111>$) area ratio of a center region (ranging deeper than $\frac{1}{10}t$ to $\frac{1}{2}t$ in a thickness direction, t refers to thickness (mm)) and a surface region (ranging from a surface to $\frac{1}{10}t$ in the thickness direction).

According to another aspect of the present disclosure, there is provided a method for manufacturing a high-strength steel sheet having high impact resistance, the method including: reheating a steel slab having the above-described alloy composition at a temperature of 1200° C. to 1350° C.; finish hot rolling the reheated steel slab under conditions satisfying [Equation 1] and [Equation 2] below to obtain a hot-rolled steel sheet; cooling the hot-rolled steel sheet at a cooling rate of 10° C./s to 100° C./s to a temperature of 400° C. to 500° C. after the finish hot rolling; and coiling the steel sheet at a temperature of 400° C. to 500° C. after the cooling, $$Tn-50 \leq FDT \leq Tn \qquad \text{[Equation 1]}$$

in which Tn refers to a temperature at which recrystallization delay starts, $Tn=730+92\times[C]+70\times[Mn]+45\times[Cr]+780\times[Nb]+520\times[Ti]-80\times[Si]$ where each element refers to a weight content, and FDT refers to a temperature (° C.) of the hot-rolled steel sheet immediately after the finish hot rolling, $$Ec \leq E1+E2 \leq 1.5 \times Ec \qquad \text{[Equation 2]}$$

in which $Ec=4.75\times10^{-4}$ $(125\times Exp(Qdef/(R\times(273+FDT))))^{0.17}$, $Qdef=277000-2535\times[C]+1510\times[Mn]+9621\times[Si]+1255\times[Cr]+53680\times[Ti]+70730\times[Nb]^{0.565}$ where each element refers to a weight content, and E1 refers to a rolling reduction in a final pass of hot rolling, E2 refers to a rolling reduction before the final hot rolling pass (pass just before the final pass), and R refers to the gas constant: 8.314.

Advantageous Effects

According to the present disclosure, it is possible to provide a steel sheet having high strength and high impact resistance. The steel sheet of the present disclosure may be suitably used as a material for automobile chassis parts.

DESCRIPTION OF DRAWINGS

FIG. 1 is images of the shear texture of a surface region (A) and the shear texture of a center region (B) of Inventive Steel 6 according to an example of the present disclosure.

BEST MODE

The inventors have intensively studied changes in the strength and impact properties of steel sheets according to the characteristics of various alloying elements and microstructures of steels. As a result, the inventors have found that a steel sheet having high impact resistance and high strength can be obtained by appropriately adjusting the contents of alloying elements in the steel sheet and optimizing the area fractions of the matrix and shear texture of the steel sheet, and based on this knowledge, the inventors have invented the present invention.

Hereinafter, the present disclosure will be described in detail.

According to an aspect of the present disclosure, a high-strength steel sheet having high impact resistance may preferably include, by weight %, carbon (C): 0.05% to 0.14%, silicon (Si): 0.01% to 1.0%, manganese (Mn): 1.5% to 2.5%, aluminum (Al): 0.01% to 0.1%, chromium (Cr): 0.005% to 1.0%, phosphorus (P): 0.001% to 0.05%, sulfur (S): 0.001% to 0.01%, nitrogen (N): 0.001% to 0.01%, niobium (Nb): 0.005% to 0.06%, titanium (Ti): 0.005% to 0.11%.

Hereinafter, reasons for limiting the alloy composition of the steel sheet will be described in detail. In this case, unless otherwise specified, the content of each element is given in weight %.

Carbon (C): 0.05% to 0.14%

Carbon (C) is the most economical and effective element for strengthening steel. As the content of C increases, precipitation strengthening increases, and the fraction of bainite increases, thereby improving tensile strength.

If the content of C in steel is lower than 0.05%, the steel may not be sufficiently reinforced, whereas if the content of C exceeds 0.14%, martensite is formed to cause an excessive increase in strength and deterioration in formability and impact resistance. In addition, weldability may also deteriorate.

Therefore, in the present disclosure, it is preferable that the content of C be within the range of 0.05% to 0.14%. More preferably, the content of C may be within the range of 0.06% to 0.13%.

Silicon (Si): 0.01% to 1.0%

Silicon (Si) has a function of deoxidizing molten steel and improving strength through solid-solution strengthening. In addition, Si is advantageous in delaying the formation of coarse carbides for improving the formability of the steel sheet.

If the content of Si is lower than 0.01%, the effect of delaying the formation of carbides is insufficient, making it difficult to improve formability. Conversely, if the content of Si exceeds 1.0%, red scale is formed on the surface of the steel sheet during hot rolling, causing a significant decrease in the surface quality of the steel sheet and a decrease in the ductility and weldability of the steel sheet.

Therefore, in the present disclosure, the content of Si may preferably be within the range of 0.01 to 1.0%. More preferably, the content of Si may be within the range of 0.05% or more.

Manganese (Mn): 1.5% to 2.5%

Like Si, manganese (Mn) is an element effective in the solid-solution strengthening of steel, and increases the hardenability of steel to facilitate the formation of bainite during cooling after heat treatment.

If the content of Mn is lower than 1.5%, the above-mentioned effects obtainable by the addition of Mn are insufficient. Conversely, if the content of Mn exceeds 2.5%, martensitic phase transformation occurs easily due to a significant increase in hardenability, segregation regions are greatly developed in a thicknesswise center region of a slab during slab casting in a continuous casting process, and impact resistance decreases due to the formation of thicknesswise non-uniform microstructures during cooling after hot rolling.

Therefore, in the present disclosure, the content of Mn may preferably be within the range of 1.5% to 2.5%. More preferably, the content of Mn may be within the range of 1.6% to 2.1%.

Aluminum (Al): 0.01% to 0.1%

Aluminum (Al) refers to sol.Al, and Al is an element mainly added for deoxidation. If the content of Al is lower than 0.01%, the effect of Al is insufficient, and if the content of Al exceeds 0.1%, Al combines with nitrogen to form an AlN precipitate, facilitating the formation of corner cracks in a slab during continuous casting and the formation of inclusion-induced defects.

Therefore, in the present disclosure, the content of Al may preferably be within the range of 0.01% to 0.1%.

Chromium (Cr): 0.005% to 1.0%

Chromium (Cr) induces the solid-solution strengthening of steel and has a function of helping bainite transformation at a coiling temperature by delaying ferrite transformation during cooling.

If the content of Cr is lower than 0.005%, the effect of Cr may not be sufficient. Conversely, if the content of Cr exceeds 1.0%, ferrite transformation is excessively delayed, and thus martensite is formed, resulting in poor elongation. In addition, similar to the case of Mn, segregation regions are greatly developed in a thicknesswise center region, and impact resistance decreases due to thicknesswise non-uniform microstructures.

Therefore, in the present disclosure, the content of Cr may preferably be within the range of 0.005% to 1.0%. More preferably, the content of Cr may be within the range of 0.3% to 0.9%.

Phosphorus (P): 0.001% to 0.05%

Like Si, phosphorus (P) is an element having a solid-solution strengthening effect and a ferrite transformation promoting effect.

Maintaining the content of P within the range of less than 0.001% is economically disadvantageous due to excessive manufacturing costs and also makes it difficult to guarantee strength. Conversely, if the content of P exceeds 0.05%, embrittlement may occur due to grain boundary segregation, fine cracks are easily formed during a forming process, and ductility and impact resistance are greatly deteriorated.

Therefore, in the present disclosure, the content of P may preferably be within the range of 0.001% to 0.05%.

Sulfur (S): 0.001% to 0.01%

Sulfur (S) is an impurity present in steel, and if the content of S exceeds 0.01%, S combines with Mn or the like to form non-metallic inclusions, thereby facilitating the formation of fine cracks during a steel cutting process and markedly decreasing impact resistance. Conversely, to maintain the content of S within the range of less than 0.001%, an excessive amount of time is required for a steel making process, causing a decrease in productivity.

Therefore, in the present disclosure, the content of S may preferably be within the range of 0.001% to 0.01%.

Nitrogen (N): 0.001% to 0.01%

Together with C, nitrogen (N) is representative of solid-solution strengthening elements, and forms coarse precipitates by combining with Ti or Al. Although the solid-solution strengthening effect of N is superior to the solid-solution strengthening effect of carbon, the toughness of steel markedly decreases as the content of N in the steel increases, and thus it is preferable to adjust the content of S to 0.01% or less. To maintain the content of N within the range of less than 0.001%, an excessive amount of time is required for a steel making process, and thus productivity decreases.

Therefore, in the present disclosure, the content of N may preferably be within the range of 0.001% to 0.01%.

Niobium (Nb): 0.005% to 0.06%

Niobium (Nb), representative of precipitation enhancing elements, is effective in improving the strength and impact toughness of steel because Nb precipitated during hot rolling delays recrystallization and thus causes grain refinement.

If the content of Nb is lower than 0.005%, the above-described effects may not be sufficient, whereas if the content of Nb exceeds 0.06%, formability and impact resistance are deteriorated by the formation of elongated grains and coarse composite precipitates caused by an excessive delay of recrystallization during hot rolling.

Therefore, in the present disclosure, the content of Nb may preferably be within the range of 0.005% to 0.06%. More preferably, the content of Nb may be within the range of 0.01% to 0.05%.

Titanium (Ti): 0.005% to 0.11%

Together with Nb, titanium (Ti) is representative of precipitation enhancing elements and forms coarse TiN in steel due to strong affinity with nitrogen (N). TiN has an effect of suppressing the growth of grains during heating for hot rolling. In addition, Ti remaining after reaction with nitrogen dissolves in steel and bonds with carbon (C) to form a TiC precipitate, and thus Ti is useful for improving the strength of steel.

If the content of Ti is lower than 0.005%, the above-described effects may not be sufficient, whereas if the content of Ti exceeds 0.11%, impact resistance for a forming process may be deteriorated due to the formation of coarse TiN and the coarsening of precipitates.

Therefore, in the present disclosure, the content of Ti may preferably be within the range of 0.005% to 0.11%. More preferably, the content of Ti may be within range of 0.01% to 0.1%.

The remaining component of the steel sheet of the present disclosure is iron (Fe). However, impurities of raw materials or manufacturing environments may be inevitably included in the high-strength steel sheet, and such impurities may not be removed from the high-strength steel sheet. Such impurities are well-known to those of ordinary skill in manufacturing industries, and thus specific descriptions of the impurities will not be given in the present specification.

It is preferable that the steel sheet of the present disclosure satisfying the above-described alloy composition include a complex phase of ferrite and bainite as a matrix thereof.

In this case, it is preferable that the sum of the area fractions of ferrite and bainite be 90% or more. If the sum of the area fractions of ferrite and bainite is lower than 90%, high strength and impact resistance may not be guaranteed.

In the composite phase, ferrite may preferably be included in an area fraction of 10% to 80%.

In addition, it is preferable that the ferrite phase have an average grain diameter (equivalent circular diameter) of 1 μm to 5 μm. If the average grain diameter of the ferrite phase exceeds 5 μm, there is a problem in that formability and collision properties decrease due to the formation of non-uniform microstructures. Conversely, if the average grain diameter is maintained within the range of less than 1 μm, a low rolling temperature or a high rolling reduction ratio is required, thereby causing an increase in the rolling load during a manufacturing process, excessive formation of shear texture, and significant deterioration in formability.

Phases other than the complex phase may include a MA phase (a mixture of martensite and austenite) and a martensite phase, and it is preferable that the total area fraction of the MA phase and the martensite phase be 1% to 10%. If the total area fraction of the MA phase and the martensite phase is greater than 10%, tensile strength increases, but yield strength decreases, thereby causing cracks along the interface between the MA phase and the martensite phase during collision and accordingly decreasing impact resistance characteristics.

As described above, the total area fraction of the coarse MA phase and the martensite phase in the matrix of the high-strength steel sheet is minimized such that unevenness in microstructure may be reduced.

Particularly, in the steel sheet of the present disclosure, the shear texture ({110}<112>, {112}<111>) area ratio of a center region and a surface region may preferably be within the range of 0.05 to 1.0, where the surface region refers to a region from a surface of the steel sheet to $\frac{1}{10}t$ in a thickness direction of the steel sheet (here, "t" refers to the thickness (mm) of the steel sheet), and the center region refers to a region from $\frac{1}{10}t$ to $\frac{1}{2}t$ in a thickness direction of the steel sheet.

The texture {110}<112> and {112}<111> is mainly formed by the phase transformation of a microstructure, non-recrystallized during hot rolling, and may be formed due to large shear deformation when the friction between rolling rolls and a raw material (steel) in surface regions increases due to a low rolling temperature or a high rolling reduction. Such textures increase the anisotropy of the steel sheet and thus deteriorate the formability of the steel sheet. However, if the amount of a microstructure non-recrystallized during hot rolling increases, ferrite deformation during phase tarnsformation is facilitated, and thus a fine and uniform microstructure may be obtained.

Therefore, if the texture area ratio of the center region and the surface region of the steel sheet is adjusted to be 0.05 to 1.0, a uniform and fine microstructure is formed, and the fraction of ferrite increases to relatively reduce the fractions of MA phase and martensite such that the yield strength and strain-rate sensitivity of the steel sheet may increase to increase energy absorption during a high-speed collision. If the area ratio of the texture exceeds 1.0, the above-described effects are saturated, and microstructures elongated in the rolling direction increase significantly to cause an increase in the anisotropy of the steel sheet and a decrease in the formability of the steel sheet.

Although a method of measuring the area fraction of the texture is not particularly limited, for example, the area fraction of the texture may be analyzed using Electron Back Scattered Diffraction (EBSD). Specifically, the area fractions of crystal orientations (110)[1 −1 −2] and (112)[−1 −1 1] in the center region and the surface region may be obtained from EBSD analysis on a rolled section, and the ratio of the area fractions may be calculated.

The steel sheet of the present disclosure having the above-described alloy composition and microstructure may have a tensile strength of 780 MPa or more and may absorb energy at a rate of 80 J/m$^3$ or more during a collision, that is, may have high strength and high impact resistance.

Hereinafter, a method for manufacturing a high-strength hot-rolled steel sheet having high bendability and high low-temperature toughness will be described in detail according to another aspect of the present disclosure.

The high-strength steel sheet of the present disclosure may be manufactured by performing a series of process [reheating-hot rolling-cooling-coiling] on a steel slab satisfying the alloy composition proposed in the present disclosure.

Hereinafter, conditions of each of the processes will be described in detail.

[Reheating Steel Slab]

In the present disclosure, prior to hot rolling, it is preferable to reheat the steel slab so as to homogenize the steel slab, and in this case, it is preferable to perform the reheating process at 1200° C. to 1350° C.

If the reheating temperature is lower than 1200° C., precipitates are not sufficiently redissolved to result in a decrease in the formation of precipitates in the processes after the hot rolling process, and there is a problem in that coarse TiN remains. Conversely, if the reheating temperature exceeds 1350° C., strength undesirably decreases due to abnormal growth of austenite grains.

[Hot Rolling]

Preferably, the reheated steel slab is hot rolled to produce a hot-rolled steel sheet, and in this case, the hot rolling process is performed within the temperature range of 800° C. to 1150° C. under finish hot rolling conditions satisfying [Equation 1] and [Equation 2].

When the hot rolling process starts at a temperature higher than 1150° C., the temperature of the hot-rolled steel sheet is increased, causing the formation of coarse grains and deteriorating the surface quality of the hot-rolled steel sheet. In addition, if the hot rolling process ends at a temperature lower than 800° C., elongated crystal grains develop due to an excessive recrystallization delay, resulting in severe anisotropy and poor formability.

In particular, in the hot rolling process of the present disclosure, if rolling is terminated at a temperature higher than the temperature range suggested in [Equation 1] below (that is, a temperature higher than Tn), the microstructure of the steel sheet is coarse and non-uniform, and phase transformation is delayed, thereby deteriorating impact resistance due to the formation of coarse MA phase and martensite. In addition, if rolling is terminated at a temperature lower than the temperature range suggested in [Equation 1] below (that is, a temperature less than Tn−50), the microstructure of the steel sheet is deformed due to an excessive delay of recrystallization, and thus the formability of the steel sheet may markedly deteriorate due to the formation of excessive shear texture {110}<112> and {112}<111>.

The above-described microstructure changes may occur to guarantee formability and impact resistance when [Equation 2] below is satisfied. More specifically, if the reduction of hot rolling is greater than the range suggested in [Equation 2] below (greater than 1.5×Ec), shear texture is excessively formed, and formability deteriorates. Conversely, if the reduction of hot rolling is lower than the range suggested in [Equation 2] below (less than Ec), fine and uniform ferrite may not be formed during cooling immediately after hot rolling, and non-uniform and coarse MA phase and martensite are formed because it is difficult to facilitate ferrite transformation, thereby deteriorating impact resistance.

$$Tn-50 \leq FDT \leq Tn \quad \text{[Equation 1]}$$

Where Tn refers to a temperature at which recrystallization delay starts, Tn=730+92×[C]+70×[Mn]+45×[Cr]+780×[Nb]+520×[Ti]−80×[Si] where each element refers to a weight content, and FDT refers to the temperature (° C.) of the hot-rolled steel sheet immediately after finish hot rolling.

$$Ec < E1+E2 \leq 1.5 \times Ec \quad \text{[Equation 2]}$$

Where Ec=4.75×10$^{-4}$ (125×Exp(Qdef/(R×(273+FDT))))$^{0.17}$, Qdef=277000−2535×[C]+1510×[Mn]+9621×[Si]+1255×[Cr]+53680×[Ti]$^{0.592}$+70730×[Nb]$^{0.565}$ where each element refers to a weight content.

In addition, E1 refers to the rolling reduction at the final pass of hot rolling, E2 refers to the rolling reduction before the final hot rolling pass (the pass just before the final pass), and R refers to the gas constant: 8.314.

In the present disclosure, when the proposed alloy composition and manufacturing conditions, particularly, hot-rolling conditions satisfy [Equation 1] and [Equation 2] at the same time, the strength, formability, and impact resistance of the steel sheet may be guaranteed as intended. More specifically, optimizing the alloy composition and manufacturing conditions (hot rolling conditions) as described above leads to an effective delay of recrystallization during hot rolling, thereby promoting ferrite transformation during phase transformation, forming fine and uniform grains, improving strength and impact resistance.

In addition, owing to the promotion of ferrite transformation, the amounts of untransformed phases are reduced during the subsequent cooling process, thereby reducing the fractions of coarse MA phase and martensite and preventing the formation of non-uniform microstructures.

If recrystallization is excessively delayed, there is a problem in that deformed microstructures are densely present in the entirety of the rolled steel sheet or only in surface regions of the rolled steel sheet to cause deterioration of formability. However, according to the present disclosure, finish hot rolling is completed between the recrystallization delay start temperature Tn and Tn−50, and thus the above-described effects may be obtained.

In addition, to effectively delay recrystallization and form uniform and fine ferrite grains, it may be necessary to adjust the reduction of hot rolling to be greater than a specific value while maintaining the hot rolling temperature within the above-described temperature range, but even in this case, excessive reduction leads to a decrease in formability. Therefore, it is necessary to adjust the reduction of hot rolling according to [Equation 2] proposed in the present disclosure.

[Cooling and Coiling]

The hot-rolled steel sheet manufactured as described above is cooled preferably at an average cooling rate of 10° C./s to 100° C./s to a temperature range of 400° C. to 500°

C. and is coiled with the temperature range. In this case, the temperature range is based on the temperature of the hot-rolled steel sheet.

At this time, if the cooling end temperature (coiling temperature) exceeds 500° C., pearlite is formed which makes it difficult to guarantee a target level of strength, and if the cooling end temperature is lower than 400° C., martensite is excessively formed which deteriorates formability and impact resistance.

In addition, if the average cooling rate is lower than 10° C./s during the cooling within the above-mentioned temperature range, there is a problem in that the grains of the matrix of the steel sheet is coarse and the microstructure of the steel sheet is uneven, and if the average cooling rate exceeds 100° C./s, a MA phase is easily formed which deteriorates formability and impact resistance.

[Final Cooling]

A coil obtained by cooling and coiling the steel sheet as described above may preferably be cooled to the temperature range of room temperature to 200° C. at a cooling rate of 0.1° C./hour to 25° C./hour.

In this case, if the cooling rate exceeds 25° C./hour, some untransformed phases in the steel sheet may easily be transformed into a MA phase, thereby deteriorating formability and impact resistance. In addition, adjusting the cooling rate to be less than 0.1° C./hour is uneconomical because additional heating equipment is required.

After this final cooling, the steel sheet is pickled and oiled, and then heated to a temperature range of 450° C. to 740° C. to perform a hot-dip galvanizing process.

The hot-dip galvanizing process may use a zinc-based plating bath, and although the alloy composition in the zinc-based plating bath is not particularly limited, for example, the zinc-based plating bath may have an alloy composition of magnesium (Mg): 0.01% to 30% by weight, aluminum (Al): 0.01% to 50% by weight, and the balance of Zn and inevitable impurities.

Hereinafter, the present disclosure will be described in more detail through an example. However, it should be noted that the following example is for illustrative purposes only and is not intended to limit the scope of the present disclosure. The scope of the present disclosure is defined by the appended claims, and modifications and variations reasonably made therein.

MODE FOR INVENTION

Example

Steel slabs having the alloy compositions shown in Table 1 below were prepared. Here, the alloy compositions are given in weight %, and the remainder include Fe and inevitable impurities. Steel sheets were manufactured from the prepared steel slabs under the manufacturing conditions shown in Table 2 below. In Table 2 below, FDT denotes a temperature during finish hot rolling, and CT denotes a coiling temperature.

In addition, the reheating temperature of the steel slabs was 1200° C., the thickness of hot-rolled steel sheets after hot rolling was 3 mm, cooling immediately after hot rolling was performed at a cooling rate of 20° C./s to 30° C./s, and the cooling rate after coiling was constant at 10° C./hour.

TABLE 1

| Steels | C | Si | Mn | Cr | Al | P | S | N | Ti | Nb |
|---|---|---|---|---|---|---|---|---|---|---|
| CS1 | 0.15 | 0.03 | 1.7 | 0.4 | 0.03 | 0.01 | 0.003 | 0.004 | 0.08 | 0.03 |
| CS2 | 0.08 | 0.4 | 1.8 | 0.8 | 0.03 | 0.01 | 0.003 | 0.004 | 0.09 | 0.02 |
| CS3 | 0.07 | 0.5 | 2.1 | 0.5 | 0.04 | 0.01 | 0.002 | 0.005 | 0.10 | 0.04 |
| CS4 | 0.08 | 0.1 | 1.8 | 0.01 | 0.03 | 0.01 | 0.003 | 0.004 | 0.09 | 0.04 |
| CS5 | 0.11 | 0.2 | 2.0 | 0.3 | 0.03 | 0.01 | 0.003 | 0.004 | 0.08 | 0.03 |
| CS6 | 0.095 | 0.3 | 1.9 | 0.4 | 0.03 | 0.01 | 0.003 | 0.003 | 0.03 | 0.05 |
| CS7 | 0.12 | 0.5 | 1.9 | 0.7 | 0.04 | 0.01 | 0.003 | 0.003 | 0.10 | 0.02 |
| CS8 | 0.13 | 0.1 | 1.8 | 0.8 | 0.04 | 0.01 | 0.003 | 0.003 | 0.07 | 0.05 |
| IS1 | 0.065 | 0.3 | 1.8 | 0.5 | 0.03 | 0.01 | 0.003 | 0.004 | 0.08 | 0.03 |
| IS2 | 0.07 | 0.01 | 1.6 | 0.7 | 0.03 | 0.01 | 0.003 | 0.0042 | 0.09 | 0.03 |
| IS3 | 0.07 | 0.9 | 1.7 | 0.6 | 0.03 | 0.01 | 0.003 | 0.0035 | 0.07 | 0.035 |
| IS4 | 0.07 | 0.3 | 1.6 | 0.7 | 0.03 | 0.01 | 0.003 | 0.004 | 0.10 | 0.02 |
| IS5 | 0.10 | 0.7 | 2.0 | 0.9 | 0.03 | 0.01 | 0.003 | 0.004 | 0.03 | 0.025 |
| IS6 | 0.11 | 0.06 | 2.0 | 0.9 | 0.03 | 0.01 | 0.003 | 0.004 | 0.04 | 0.04 |
| IS7 | 0.13 | 0.6 | 1.95 | 0.6 | 0.03 | 0.01 | 0.003 | 0.003 | 0.05 | 0.03 |

TABLE 2

| | FDT | CT | Equation 1 | | Equation 2 | | | | |
|---|---|---|---|---|---|---|---|---|---|
| Steels | (° C.) | (° C.) | Tn | Evaluation | E1 | E2 | Ec | Qdef | Evaluation |
| CS1 | 902 | 446 | 943 | ○ | 9 | 20 | 20.6 | 301766 | ○ |
| CS2 | 940 | 435 | 930 | x | 9 | 18 | 18.5 | 305028 | ○ |
| CS3 | 874 | 455 | 949 | x | 13 | 23 | 27.4 | 310641 | ○ |
| CS4 | 896 | 490 | 934 | ○ | 15 | 25 | 22.3 | 304869 | x |
| CS5 | 906 | 485 | 943 | ○ | 6 | 13 | 21.0 | 303831 | ○ |
| CS6 | 850 | 453 | 920 | x | 16 | 26 | 26.8 | 302768 | x |
| CS7 | 892 | 530 | 933 | ○ | 9 | 25 | 23.5 | 306745 | ○ |
| CS8 | 930 | 385 | 971 | ○ | 8 | 25 | 19.4 | 305492 | x |
| IS1 | 876 | 445 | 925 | ○ | 10 | 21 | 24.5 | 304856 | ○ |
| IS2 | 911 | 459 | 949 | ○ | 10 | 18 | 20.2 | 302871 | ○ |
| IS3 | 850 | 452 | 874 | ○ | 15 | 27 | 30.8 | 310563 | ○ |
| IS4 | 880 | 455 | 924 | ○ | 12 | 21 | 23.9 | 304495 | ○ |
| IS5 | 879 | 445 | 899 | ○ | 10 | 23 | 23.4 | 303164 | ○ |
| IS6 | 922 | 430 | 968 | ○ | 8 | 18 | 18.6 | 300908 | ○ |
| IS7 | 885 | 457 | 907 | ○ | 12 | 21 | 23.6 | 305006 | ○ |

(In Table 2 above, Ec refers to calculated values expressed in percentages (calculated value × 100).)

The mechanical properties, that is, tensile strength (TS), yield strength (YS), and elongation (T-E1), and the absorbed impact energy of each of the steel sheets prepared as described above were measured, and the microstructure of the steel sheet was observed as shown in Table 3 below.

Specifically, the yield strength and elongation respectively refer to yield strength at 0.2% offset and breaking elongation, and the tensile strength was measured using a JIS No. 5 specimen taken in a direction perpendicular to the rolling direction.

In addition, the absorbed impact energy was measured by a high-speed tensile test method, and since the strain rate of a material is from 100 s$^{-1}$ to 500 s$^{-1}$ when an automobile crashes, a high-speed tensile test was performed at strain rates of 200 s$^{-1}$ and 500 s$^{-1}$ on a specimen taken according to the same standard as the above-mentioned tensile specimen to measure the area under the obtained stress-strain curve until an elongate of 10% as the absorbed impact energy of the specimen.

In addition, the MA phase formed in the steel sheet was analyzed by etching the steel sheet using a Lepera etching method and observing the steel sheet at a magnification of 1000 times using an optical microscope and an image analyzer, and austenite was analyzed using Electron Back Scattered Diffraction (EBSD) at a magnification of 3000 times. In addition, the fractions of martensite, ferrite, and bainite were analyzed using a scanning electron microscope (SEM) at magnifications of 3000 times and 5000 times. In addition, the area fraction of shear texture was measured using the above-mentioned Electron Back Scattered Diffraction (EBSD).

impact energy. Furthermore, in Comparative Steel 3 of which FDT is excessively less than the range specified in Equation 1, the amount of shear texture in the surface region was more increased than the center region, and thus absorbed impact energy was low due to a significant decrease in elongation even though strength was increased.

Comparative steels 4 and 5 are cases in which the rolling reduction conditions for hot rolling do not satisfy Equation 2. In Comparative Steel 4 of which the sum of the reduction in the final pass and the reduction in the previous pass exceeds the range specified in Equation 2, the amount of shear texture in the surface region was more increased than the center region, and thus absorbed impact energy was low due to a significant decrease in elongation even though strength was increased. Furthermore, in Comparative Steel 5 of which the sum of the reduction in the final pass and the reduction in the previous pass is lower than the range specified in Equation 2, ferrite transformation was not

TABLE 3

| Steels | Mechanical properties | | | Microstructure | | | | Shear Texture | Impact resistance | |
|---|---|---|---|---|---|---|---|---|---|---|
| | YS (MPa) | TS (MPa) | T-El (%) | F(%) | B(%) | Y(%) | M(%) | Area fraction | 200$^{-1}$ (J/m$^3$) | 500$^{-1}$ (J/m$^3$) |
| CS1 | 725 | 978 | 9 | 45 | 37 | 4 | 14 | 0.85 | 77 | 81 |
| CS2 | 688 | 855 | 14 | 61 | 28 | 3 | 8 | 1.05 | 78 | 86 |
| CS3 | 728 | 924 | 9 | 58 | 34 | 1 | 7 | 1.40 | 74 | 83 |
| CS4 | 695 | 870 | 10 | 59 | 34 | 0 | 7 | 1.35 | 77 | 88 |
| CS5 | 740 | 956 | 10 | 33 | 56 | 2 | 9 | 0.31 | 78 | 87 |
| CS6 | 755 | 960 | 8 | 48 | 44 | 2 | 6 | 1.50 | 76 | 79 |
| CS7 | 688 | 815 | 15 | 57 | 32 | 2 | 1 | 0.36 | 72 | 83 |
| CS8 | 885 | 1085 | 7 | 22 | 53 | 4 | 21 | 0.14 | 78 | 80 |
| IS1 | 685 | 815 | 14 | 74 | 23 | 1 | 2 | 0.35 | 82 | 93 |
| IS2 | 689 | 792 | 15 | 72 | 26 | 0 | 2 | 0.28 | 81 | 94 |
| IS3 | 675 | 821 | 15 | 76 | 21 | 1 | 2 | 0.33 | 82 | 92 |
| IS4 | 715 | 835 | 17 | 75 | 21 | 1 | 3 | 0.34 | 83 | 90 |
| IS5 | 803 | 922 | 11 | 38 | 56 | 2 | 4 | 0.30 | 95 | 104 |
| IS6 | 820 | 994 | 10 | 16 | 76 | 2 | 6 | 0.11 | 96 | 102 |
| IS7 | 815 | 1008 | 10 | 14 | 79 | 2 | 5 | 0.13 | 94 | 110 |

(In Table 3, Y and M respectively refer to fractions in the MA phase.)

As shown in Tables 1 to 3 above, each of Inventive Steels 1 to 7 satisfying both the alloy composition and manufacturing conditions proposed in the present disclosure had a complex phase of ferrite and bainite as a matrix, and a shear texture area ratio, that is, a shear texture area ratio of a center region and a surface region (shear texture area fraction in center region/shear texture area fraction in surface region) within the range of 0.05 to 1.0. Thus, Inventive Steels 1 to 7 had intended high strength and large amounts of absorbed impact energy.

However, in Comparative Steel 1 having an excessive C content compared with the alloy composition proposed in the present disclosure, MA phase and martensite were excessively formed because of a high C content in an untransformed phase, and thus absorbed impact energy of Comparative Steel 1 was low. It is considered that the reason for this is rapid fracture along the boundary between MA phase and martensite during high-speed deformation.

Comparative steels 2 and 3 are cases in which the finish hot rolling temperature during hot rolling does not satisfy Equation 1. Particularly in Comparative Steel 2 of which FDT exceeds the range specified in Equation 1, almost no shear texture was developed, and ferrite transformation was not promoted, resulting in the formation of MA phase and martensite in high fractions and a small amount of absorbed promoted, and the fractions of MA phase and martensite phase were markedly increased, resulting in a small amount of absorbed impact energy.

In Comparative Steel 6 of which the hot rolling conditions do not satisfy both of Equations 1 and 2, the amount of shear texture in the surface region was excessively greater than the amount of shear texture in the center region, resulting in a significant decrease in elongation and a decrease in absorbed impact energy. In particular, the absorbed impact energy at a condition of 500 s$^{-1}$ was markedly decreased, and thus Comparative Steel 6 was not suitable for collision at a high strain rate.

Comparative steels 7 and 8 are cases in which the temperature range during coiling is outside the range proposed in the present disclosure. In Comparative Steel 7 having an excessively high coiling temperature, pearlite was formed in the microstructure, resulting in failure in guaranteeing a target level of strength and a small amount of absorbed impact energy. It is considered that the reason for this is that: since not bainite but perlite was formed from an untransformed phase due to a high coiling temperature, the strength of steel was not sufficiently secured, and fracture rapidly propagated to the pearlite during high-speed deformation. Comparative steel 8, of which the coiling temperature was low, had excessively high strength due to the formation of a large amount of martensite and absorbed a small amount of impact energy. It is considered that the reason for this is that during high-speed deformation, fracture rapidly occurred because of a local increase in dislocation density.

FIG. 1 is images of shear texture in a surface region (A) and shear texture in a center region (B) of Inventive Steel 6, wherein the area fraction of the shear texture in the surface region (A) is 0.217(0.130+0.087), the area fraction of the shear texture in the center region (B) is 0.025(0.019+0.006), and the ratio (B/A) is 0.11.

The invention claimed is:

1. A steel sheet comprising: by weight %, carbon (C): 0.05% to 0.14%, silicon (Si): 0.01% to 1.0%, manganese (Mn): 1.5% to 2.5%, aluminum (Al): 0.01% to 0.1%, chromium (Cr): 0.005% to 1.0%, phosphorus (P): 0.001% to 0.05%, sulfur (S): 0.001% to 0.01%, nitrogen (N): 0.001% to 0.01%, niobium (Nb): 0.005% to 0.06%, titanium (Ti): 0.005% to 0.11%, and a balance of iron (Fe) and inevitable impurities, wherein the steel sheet has a microstructure comprising: ferrite and bainite in a total area fraction of 90% or more; and a MA phase, which is a complex phase of martensite and austenite, and martensite in a total area fraction of 1% to 10%, and the steel sheet has a value of 0.05 to 1.0 as a $\{110\}<112>$ and $\{112\}<111>$ shear texture area ratio of a center region ranging $\frac{1}{10}$ t to $\frac{1}{2}$ t in a thickness direction to a surface region ranging from a surface to $\frac{1}{10}$ t in the thickness direction, where t refers to a thickness of the steel sheet in mm.

2. The steel sheet of claim 1, wherein the ferrite has an average grain diameter within a range of 1 μm to 5 μm.

3. The steel sheet of claim 1, wherein the steel sheet has a tensile strength of 780 MPa or more, and absorbs energy in an amount of 80 J/m$^3$ or more during a collision.

* * * * *